United States Patent [19]

Valyi

[11] Patent Number: 5,673,807
[45] Date of Patent: Oct. 7, 1997

[54] CUP AND CLOSURE

[76] Inventor: Emery I. Valyi, 102 Moseman Ave., Katonah, N.Y. 10536

[21] Appl. No.: 372,021

[22] Filed: Jan. 12, 1995

[51] Int. Cl.⁶ .................................................. B65D 17/44
[52] U.S. Cl. .................. 215/232; 215/250; 215/346; 220/255; 220/258; 220/276
[58] Field of Search .................................. 215/226, 230, 215/232, 250, 253, 258, 303, 346; 220/255, 258, 276

[56] References Cited

U.S. PATENT DOCUMENTS

| | | | |
|---|---|---|---|
| 3,804,282 | 4/1974 | Komendowski | 215/228 X |
| 4,747,501 | 5/1988 | Greaves | 215/253 |
| 5,297,599 | 3/1994 | Bucheli | 215/250 X |
| 5,325,976 | 7/1994 | Valyi et al. | 215/232 |

*Primary Examiner*—Stephen Cronin
*Attorney, Agent, or Firm*—Bachman & LaPointe, P.C.

[57] ABSTRACT

A container and closure assembly includes a container including a bottom portion and an encircling wall extending therefrom and defining a body portion. The body portion has an open end with a span equal to or different than the span of the body portion. The assembly also includes a removable cap liner including a seal for sealably engaging the container at its open end in a manner which traps fluids in the container and a removable cap which substantially covers the cap liner and thereby the open end of the container. The cap is adapted for reclosing the container after it is removed from the container.

11 Claims, 3 Drawing Sheets

CUP AND CLOSURE

BACKGROUND OF THE INVENTION

This invention relates to containers and closures, and more particularly, to a container having a removable, fluid sealable closure, especially gas sealable, which upon removal leaves a normal drinking glass.

Typical commercial containers for holding carbonated beverages are glass bottles or metal cans having twist off tops and pull tabs, respectively, for opening same. The tops and pull tabs are securely and sealably attached to the bottles and cans, respectively, for sealing in all fluids, including gases, associated with carbonation. After removing the cap or tab, drinking the contents of the container is cumbersome, often unhygienic, preferably requiring a separate glass or cap. Such opened cans and bottles are typically usable only for recycling, unless altogether discarded.

A primary design feature of commercial containers which makes them undesirable and unaesthetic from which to drink, and even less for continued home use, are the threads on a small opening, as with a bottle, or the even smaller opening given by the tab, which may have gathered dirt, as with a can. With these types of closures, consumers of the beverages are inconvenienced, nor do they have any incentive to keep the containers for re-use. Accordingly, common shortcomings of commercial containers lie in the shape of the container and in the closure typically used.

The prior art does include a container and closure assembly wherein threads or punched tabs are not used. U.S. Pat. No. 5,325,976 to Valyi et al. discloses such a container closure assembly. The assembly includes a plastic container, a barrier and a closure member. The barrier layer and the closure member completely cover the access opening to the container and the barrier layer includes a weakened portion thereof which is broken upon removing the closure member. Accordingly, the container closure assembly includes a sealing closure which does not use the unaesthetic features of threads or tabs and is protected from contamination. However, the container disclosed in the patent is of the typical bottle shaped commercial containers used for carbonated and other beverages such as soda and juice.

There exists, therefore, a need in the container art for a container and closure assembly wherein the container is in the form of an aesthetically pleasing drinking glass or the like and the closure is fluid, especially gas sealable without using threaded caps or tab-opening arrangements.

SUMMARY OF THE INVENTION

The primary object of this invention is to provide an aesthetically pleasing container and closure assembly wherein carbonated beverages can be stored and from which the said beverages can be conveniently consumed.

Another object of this invention is to provide a reclosable container and closure assembly which retains carbonation until first opened.

Another object of this invention is to provide a container and closure assembly wherein the closure sealably closes the container for maintaining carbonation while the container is a typical drinking glass or cup having a rim adapted for convenient use.

Still another object of this invention is to provide a container and closure assembly wherein all necessary advertisement or the like can be placed on the closure so as to leave the container itself free of conspicuous advertising.

The above objects and more are achieved by the container and closure assembly of the present invention. The assembly comprises a container including a bottom portion and an encircling wall extending therefrom and defining a body portion. The body portion has an open end with a span equal to or different than the span of the body portion, as for example, greater than the span of parts of the body portion. The assembly also includes a removable cap liner including means for engaging the container at its open end to close the container, as in a manner which retains fluids, especially gases, in the container and a removable cap over the cap liner and thereby over the open end of the container. The cap and liner are adapted for reclosing the container after removal from the container.

In one embodiment of the invention, the container and cap are formed from the same molded piece; the container is a drinking glass; and the container includes a lip portion adapted for drinking located at the open end for engagement with the cap liner, as for example, a thickened lip portion.

A process for producing the container and closure of the present invention includes the steps of molding a preliminary container, as an oriented preliminary container, including a closed bottom end, a body portion and a shoulder and neck portion; separating the shoulder and neck portion from the body portion of the preliminary container; forming an open ended second container from the body portion, the second container having an encircling wall and an outer surface; forming a cap from the shoulder and neck portion; providing a cap liner, as by molding, and attaching the cap liner to the second container, wherein the cap liner sealably engages the second container at its open end in a manner which retains fluids in the second container; and placing the cap over the cap liner.

In one embodiment, the preliminary container includes an outwardly extending flange.

In a further embodiment, the present invention comprises: a container including a bottom portion and an encircling wall extending therefrom and defining a body portion, wherein the body portion has an open end defined by a rim; a removable cap liner including means for sealably engaging the container at its open end in a manner which retains fluids in the container; and a removable cap over the cap liner and thereby over the open end of the container including means to break the cap liner and open the container upon movement of the cap; a plurality of pressure-release vents in the cap liner and means for closing the vents in the cap; whereby, pressure is released from the pressure-release vents upon moving the cap followed by breaking the cap liner upon continued movement of the cap.

The details of the present invention are set out in the following description and drawings wherein like reference characters depict like elements.

DETAILED DESCRIPTION OF THE PREFERRED EMBODIMENT

Figure 1A:
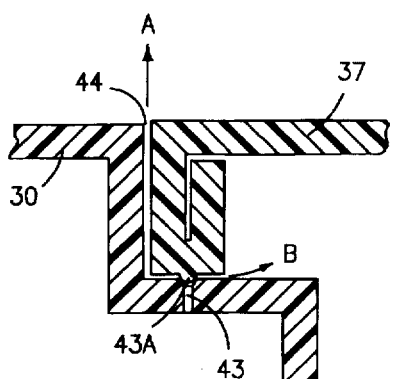
FIG. 1A is an enlarged cross-sectional view of a portion of the container closure assembly of FIG. 1.
Figure 1:
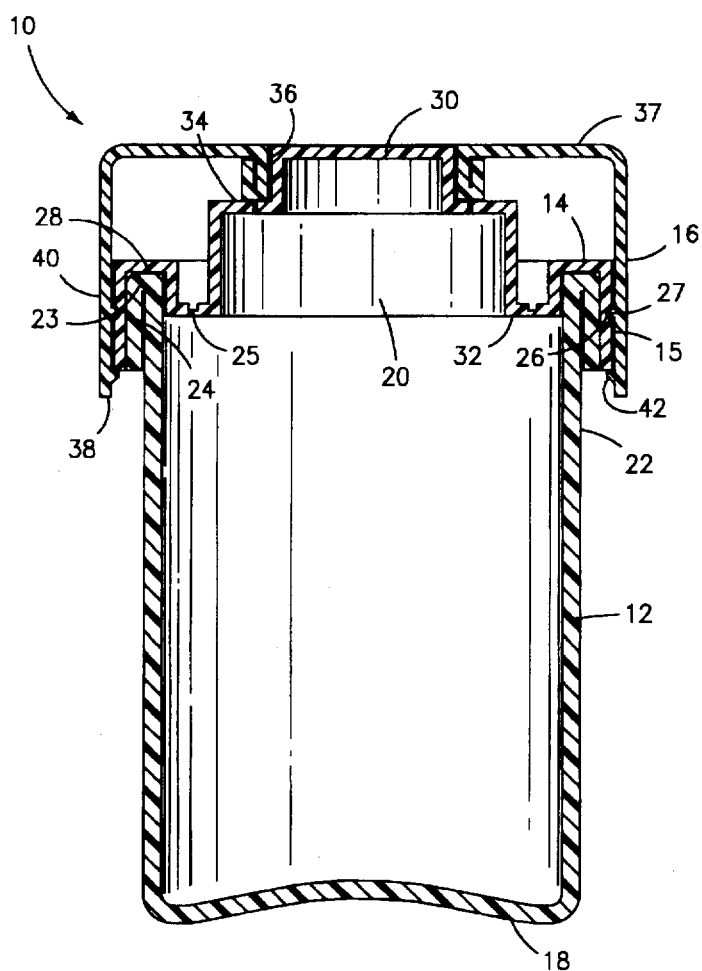
FIG. 1 is a cross-sectional view of the container and closure assembly showing the cap, cap liner and drinking glass portion in accordance with the principles of the present invention.

Referring now to the drawings in detail, there is shown in FIG. 1 a cross sectional and elevational view of the container and closure of the present invention designated generally as 10. Container and closure 10 comprises a container portion 12, a cap liner 14 and a cap 16, all preferably formed from crystallized polyethylene terephthalate (PET). The PET may be transparent, opaque or tinted, whichever is desirable.

Container portion 12 is essentially in the form of a drinking glass or cup typically used for single servings in homes, restaurants and bars. Container portion or drinking glass 12 may desirably have a straight side wall or a shape which diverges outwardly or inwardly from base 18 to an open end 20, although naturally other desirable shapes can be used. Accordingly, container portion 12 has any desirable shape convenient for drinking, but may include other indents or decorations such as swirls on the outer surface 22 of container portion 12.

Adjacent open end 20, container portion 12 may include a thickened ring 24 flattened against surface 22 and extending downwardly a short distance from open end 20 on surface 22. Thickened ring 24, if used, is formed in a cutting and folding process, discussed below, wherein thickened ring 24 may if desired have a circumferential recess which is used to engage a snap ring of cap liner 14 such that cap liner 14 may be removably but securely fastened to container portion 12. Container portion 12 preferably has a volume to carry a single serving of liquid such as for example, soda, seltzer or beer, or non-carbonated liquids such as juice, water or any other beverage.

Cap liner 14 is the element which seals container 12 as by bonding rim 23 of container 12 to liner 14 at bonded portion 28 which functions as a seal as described in U.S. Pat. No. 5,325,976. In particular, when a carbonated beverage is being stored in container 12 for a substantially long period of time, it is necessary to efficiently seal container 12 such that gases from the carbonation do not escape therefrom, so as to maintain the desired amount of carbonation.

The container closure assembly disclosed in U.S. Pat. No. 5,325,976 (hereinafter referred to as Valyi et al. '976), issued Jul. 5, 1994, is hereby incorporated into this application, wherein the closure member described in detail therein may be used with the present invention, most applicably, the embodiment shown in FIG. 4.

Based on the design disclosed in Valyi et al. '976, container 12 may if desired also include a recess in thickened ring 24 extending therearound for engagement with a snap ring of the liner. Naturally, any given container will use the same configuration extending around the rim thereof. The preferred embodiment is shown in FIG. 1 with a flat outer face of thickened ring 24 and a recess 26 in the outer face 15 of liner 14 for engagement with snap ring 27 of cap 16. Cap 16 is caused to be removed from container 12, as by snap ring 27 being caused to disengage from or snap out of recess 26, as described in detail in the incorporated patent, or by simply sliding the cap 16 and liner 14 assembly away from container 12. As an alternative, container 12 could include a projection for engagement with a recess provided in an alternative embodiment of the closure member shown in FIG. 5 of Valyi et al. '976.

Figure 5:
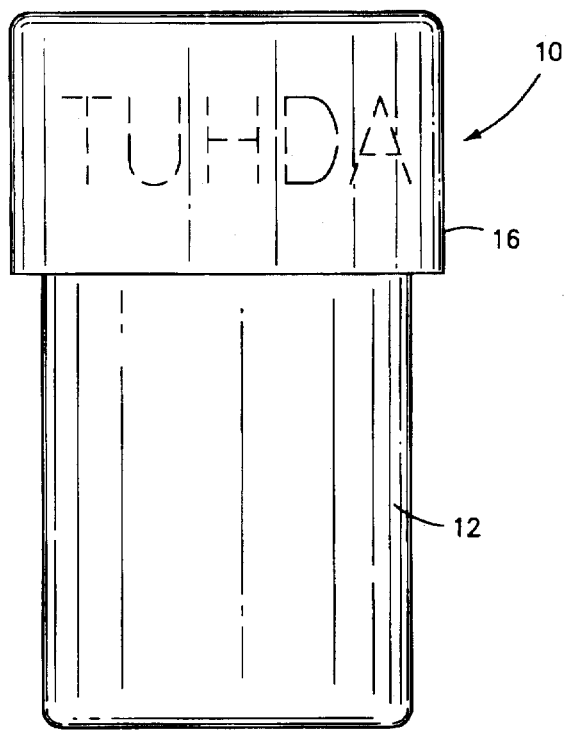
FIG. 5 is an elevational view of the container and closure assembly of the instant invention.

The cap liner 14 also has a stepped circular configuration such that the upper surface 34 thereof, includes an extension 30. Extension 30 is preferably raised from upper surface 34, in the form of a multi-sided geometric shape, preferably hexagonal, similar to a nut fastener, shown in the top view of FIG. 2. Extension 30 is adapted to be engaged by a recess 36 of cap 16. Cap liner 14 also includes a weakened portion 25 in the lower circular surface 32 thereof. Alternatively, the multi-sided element in the cap liner can be a depression adapted to be engaged by the cap as shown in FIG. 5 of Valyi et al. '976.

Cap 16, which engages and substantially covers liner 14, is used to twist liner 14 and break weakened portion 25 provided by cap liner 14, so as to expose the contents of container 12. Cap 16 is essentially a cup shaped member having a top end 37 with an opening therein defined by recess 36, and a skirt 40, extending from top 37 defining an open bottom 38. Skirt 40 is adapted to extend over cap liner 14 and if desired engage the bottom end thereof as via a locking cam 42, which extends around the circumference of cap 16, adjacent the bottom edge thereof. Skirt 40 is of a length which extends over a substantial portion of the body of the container 12 in assembly 10, for example, approximately one eighth to one third the length of the assembly 10.

Cap 16 is adapted to be placed over and onto cap liner 14 for engaging extension 30. Cap 16 together with liner 14 can be used for reclosing container portion 12 after opening, wherein locking cam 42 may if desired be provided so as to engage thickened ring 24. The reclosing seal, however, need not be sufficient to hold full carbonation. Skirt 40 extends from cap 16 and is preferably of a size to hold a large insignia or other decoration, preferably by which the beverage is identified. Liner 14 may also carry a logo or decoration, and be colored, with cap 16 made from a transparent material.

Cap 16 includes wrench key recess 36 which is an opening through end 37 in the shape of but slightly larger than extension 30, as shown in FIG. Wrench key recess 36 securely engages extension 30 such that upon twisting of cap 16, weakened portion 25 is caused to break, freeing the contents of container 12, as described in the incorporated patent.

In using the container and closure 10, cap liner 14 may be attached to the container portion 12 as shown in FIG. 1 and substantially as described in the incorporated U.S. Patent, Valyi et al. '976. After container 12 is filled with the beverage and cap liner 14 installed, cap 16 is placed over cap liner 14. Cap 16 snaps over thickened ring 24 such that it is securely but removably attached to container 12.

Upon twisting cap 16, the relatively weaker portion 25 of liner 14 located adjacent the inner wall of the rim 23 of container 12, shears due to the torque transmitted from wrench key recess 36 of cap 16 to extension 30 of liner 14. This process functions to open the entire top of container 12, and may also if desired serve to decompress the contents and to actuate a tampering indicator (not shown).

Figure 2:
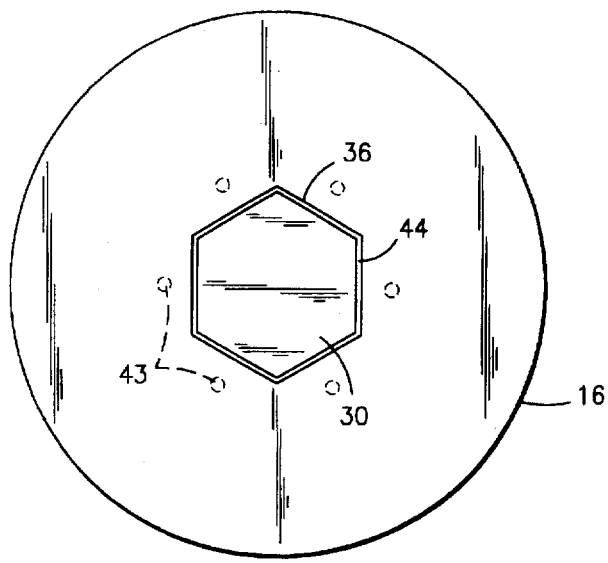
FIG. 2 is a top view of the assembly shown in FIG. 1.

Naturally, internal pressure against that portion of the liner which is intended to be removed may reach a force in excess of that which a person opening the container may hold. Therefore, it may be advisable to release said pressure before fully fracturing the weakened portion. This may be accomplished by the arrangement of vent passages 43 in liner 14 as shown in FIGS. 1A and 2.

Thus, as weakened portion 25 is broken, the full pressure (up to several hundred pounds) acts against the liner 14 without anything holding it to keep it from being forcefully propelled away. In order to preclude this, venting of the pressure is provided before portion 25 is broken. For example, as shown in FIGS. 1A and 2, a series of small holes or vents 43 are arranged circumferentially alongside extension 30, and a series of matching plugs 43A is juxtaposed said holes as part of cap 16. The holes are kept closed due to sealing action of plugs 43A. Wrench key recess is made slightly larger than to match extension 30 with small space 44 being provided therebetween so that no torque is transmitted until an initial twisting movement will have been imparted to cap 16. The difference in dimensions is designed to be sufficient to allow for twisting cap 16 to release plugs 43A from holes 43, but not enough to thereafter preclude interference and thus transmittal of torque to weakened sections 25. Accordingly, upon initial twisting, pressure is released as shown by arrows A and B in FIG. 1A, and upon continued twisting, the weakened section 25 is broken as described above.

Figure 3:
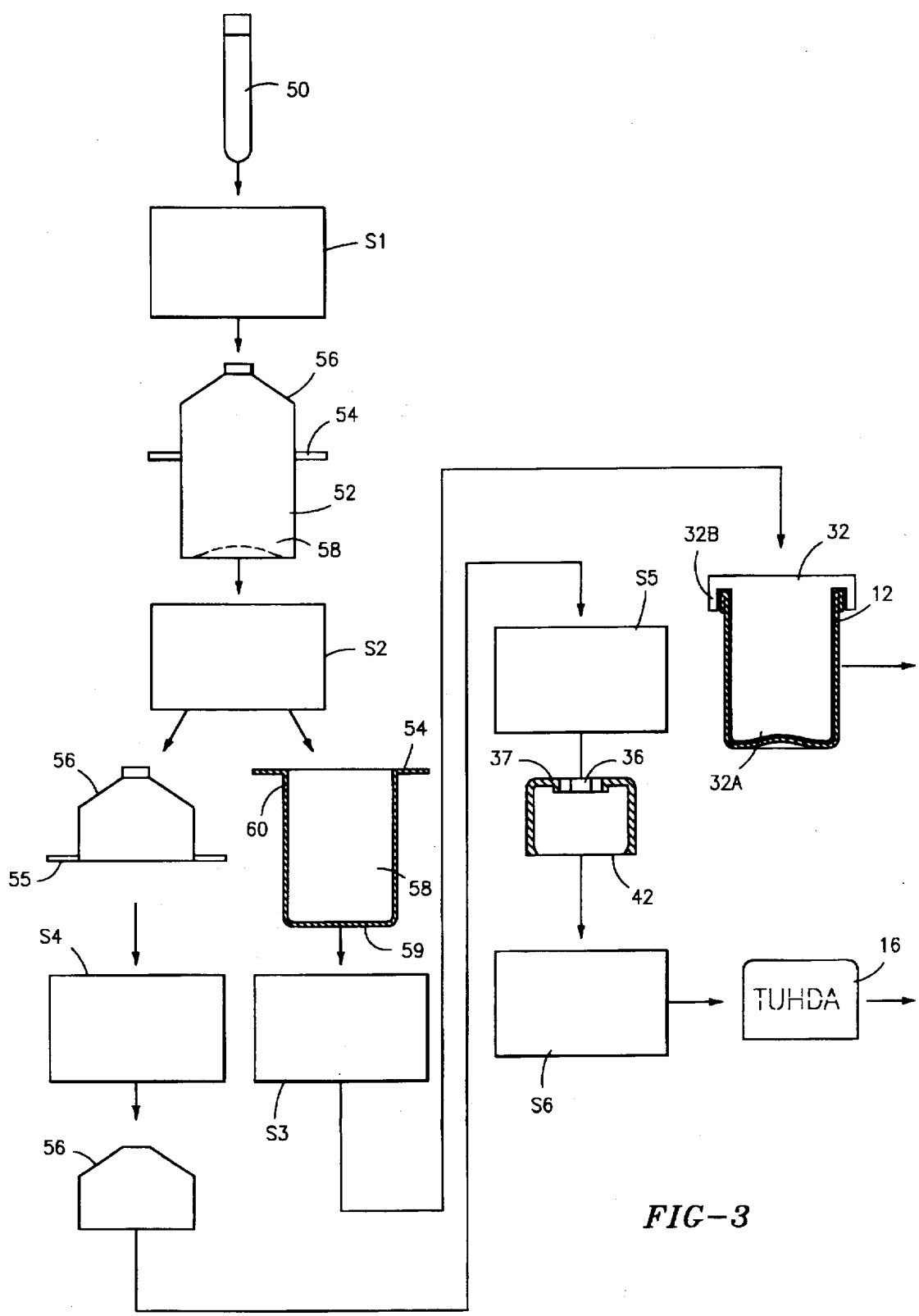
FIG. 3 is a schematic view of the process for manufacturing the elements comprising the present invention.
Figure 4:
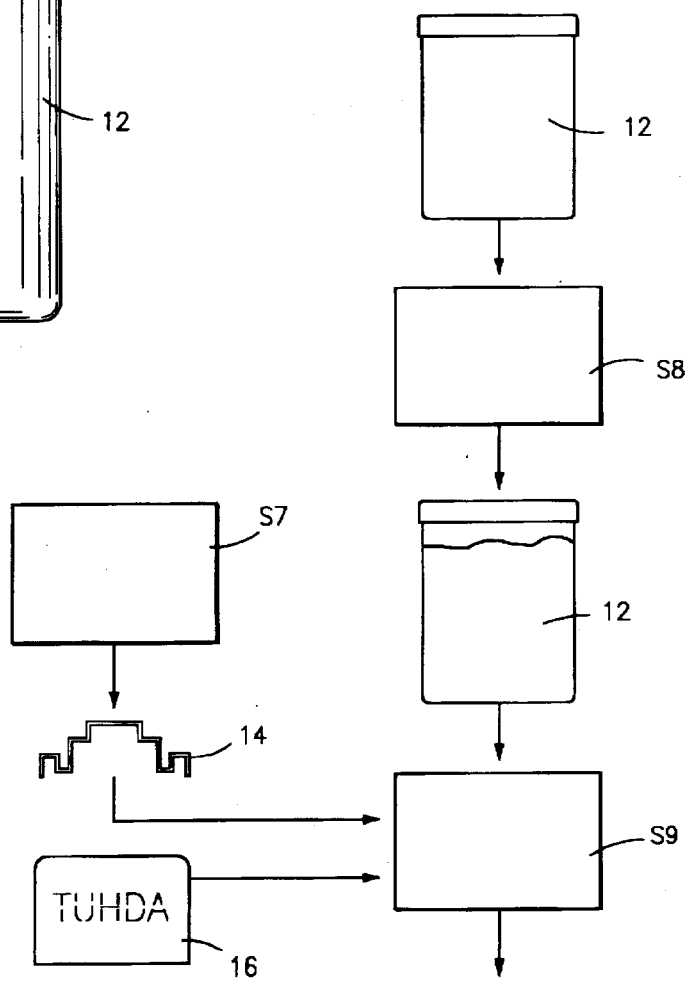
FIG. 4 is a schematic view of the process for further manufacturing and assembling the elements comprising the present invention.

The process for forming the container and closure 10 is as follows and as shown in FIGS. 3 and 4. Referring now to FIGS. 1 and 3, container portion 12 and cap 16 are formed from a single, unitary preliminary container. Initially, a preform 50 is injection molded. The preform is then stretch blow molded in step S1 into a preliminary container 52 as shown in FIG. 3, preferably having a folded, transversely extending flange 54 extending outwardly from the upper shoulder and neck portion 56 of preliminary container 52. The blow molding operation is preferably a stretch blow molding technique similar to that used for forming tennis ball cans in U.S. Pat. No. 4,576,843. The patent describes a tennis ball can blowing process which acquires full orientation of the container portions including the rim.

In step S2, lower body portion 58 is severed from upper shoulder and neck portion 56 preferably through flange 54. The severing can be accomplished by any convenient means, as via a laser, a light pressure fluid jet, or with a hot knife. The severing of the precontainer in forming container portion 12 is significant. That is, brittleness in the rim section of container portion 12 is avoided by acquiring the full orientation of the rim section from the full orientation of the blow molded precontainer. This is not possible by forming container portion 12 and its rim with an injection molded wide mouthed preform.

Unlike the tennis ball can process described in the above mentioned patent, however, upper shoulder and neck portion 56 of preliminary container 52 is not discarded. Rather, in the instant invention, the cut off upper shoulder and neck portion 56 is used to form cap 16, as discussed below.

In further forming container portion 12, flange 54, extending from the open top end of lower body portion 58 may be folded over and flattened against the outside surface 60 of lower body portion 58 forming the thickened ring 24, as described above and to which liner 14 and cap 16 may be later attached (see FIG. 1), although, if desired, it may be otherwise shaped to form a smooth rim. Similarly, flange 55 extending from the cut off upper shoulder and neck portion 56 may be folded down or against the side thereof.

The operation of folding may be combined in step S3 with crystallizing if the latter is desired using a heated tool 32 consisting of a mandrel 32A which may be heated and a forming collar 32B with which to shape flange 54, thereby forming a crystallized container portion 12 as described above. Thus, lower body portion 58 is forwarded to tool 32, wherein flange 54 is bent downwardly and conformed to the outside surface 60 of lower body portion 58 for forming container 12. In addition, lower body portion 58 is crystallized in step S3 while preserving full orientation with high crystallinity throughout, including base or bottom 18. Because of its open top configuration, body portion 58 and its bottom 59 are crystallized in a simplified process, since a heated mandrel may thus be easily inserted for preventing shrinkage during heating. Accordingly, the original dimensions are preserved without reblowing.

Referring still to FIG. 3, and regarding the formation of cap 16, in step S4 the cut off upper shoulder and neck portion 56 of preliminary container 52 is heated to a molding temperature. In step S5, the heated upper shoulder and neck portion 56 is reformed, as by a compression mold, into cap 16. Locking cam 42 may if desired be formed on cap 16 in the same operation. The top 37 of the upper shoulder and neck portion 56 of preliminary container 52 may be shaped to conform to wrench key recess 36 which is preferably injection molded as part of preform 50, to engage multi-sided extension 30 extending from the top of cap liner 14, as described above.

In step S6, the formed cap 16 is forwarded to a printer, where a label, logo, or other descriptive symbol is placed thereon for identifying the contents of container 12. Cap 16 and container 12 are then forwarded to a capping process, see FIG. 4, for assembling container 12 with cap liner 14 and cap 16.

Cap liner 14 is preferably injection molded in step S7 into the structure described above including the stepped design. Information regarding the cap liner 14 is found in the incorporated patent '976 to Valyi et al. After forming cap liner 14, it is moved to an assembly station for attachment to container 12 after filling same.

The final steps of the process include the filling and capping of container 12 and are shown in FIG. 4. At this juncture, container 12 is filled with a liquid in step S8. In step S9, container 12, cap liner 14 and cap 16 are forwarded to a two-stage capper for forming the final container and closure product 10. The first stage of the capping process applies cap liner 14 to the rim of container portion 12 as by seaming, or welding, or other attachment.

After cap liner 14 is secured adjacent the rim of container 12, cap 16 is applied over liner 14 and container 12 such that locking cam 42 of cap 16 engages the bottom edge of cap liner 14 and wrench key recess 36 of cap 16 is adjacent multi-sided extension 30 of cap liner 14 for subsequent engagement as described above. This allows for the securing of cap 16 to container 12 and for subsequent opening of container 12, respectively. The finished container and closure product 10 is shown FIG. 5.

Naturally, if ductility and formability of the rim are not required, container 12 may also be produced by other methods well known in the art, e.g., injection molding.

Based on the structure and process described above, container and closure 10 has an extensive shelf life for maintaining carbonation. Such shelf life is particularly useful in that it avoids excessive carbonation loss in storage and in product transfer. However, if additional time is required, a laminate may be used for forming the container, for example, having 10–20% nylon inside or outside the PET comprised container portion, which can be produced from an over molding step for forming the necessary preforms.

The primary advantage of this invention is that an aesthetically pleasing container and closure assembly is provided wherein beverages can be sealably stored, especially carbonated beverages. Another advantage of this invention is that a container and closure assembly is provided which uses a barrier layer for sealing the container. Yet another advantage of this invention is that a container and closure assembly is provided wherein the closure sealably closes the container for maintaining carbonation while the container is a typical drinking container. Still another advantage of this invention is that a container and closure assembly is provided wherein all necessary decorations, including advertisements or the like can be placed on the closure assembly so as to leave the container itself free of such decorations. A further advantage is that venting gas can be easily accommodated before opening the container.

It is apparent that there has been provided in accordance with this invention a cup and closure which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A container and closure assembly, comprising:

a container including a bottom portion and an encircling wall extending therefrom and defining a body portion, wherein the body portion has an open end defined by a rim;

a removable cap liner including means for sealably engaging the container at its open end in a manner which retains fluids in the container;

a removable cap over the cap liner and thereby over the open end of the container, said cap having a skirt which extends over a portion of said body portion and wherein the cap and liner are adapted for reclosing the container after removal from the container;

wherein the cap includes means for engaging the cap liner to at least partly remove said liner, the cap liner includes multi-sided means adapted to be engaged by the cap, and the cap means for engaging comprises a multi-sided receiver means, said multi-sided means adapted to be engaged and said receiver means including matching surfaces of engagement; and wherein the means for sealably engaging comprises a seal spanning the open end, the cap liner including a weak portion adapted to be broken upon twisting the cap liner.

2. The container and closure assembly according to claim 1, wherein the container is in the form of a drinking container.

3. The container and closure assembly according to claim 1, wherein the cap includes an extended skirt adapted to carry indicia.

4. The container and closure assembly according to claim 1, wherein each of the multi-sided means adapted to be engaged by the cap and multi-sided receiver means include a plurality of corresponding flat surfaces.

5. The container and closure assembly according to claim 1, wherein the container includes a lip portion adapted for drinking and located at the open end.

6. The container and closure assembly according to claim 5, wherein the cap liner engages the lip of the container in a manner which impedes escape of fluids from the container.

7. The container and closure assembly according to claim 5, wherein the open end of the container has a diameter equal to or greater than the diameter of at least parts of the body portion.

8. A container and closure assembly, comprising:

a container including a bottom portion and an encircling wall extending therefrom and defining a body portion, wherein the body portion has an open end defined by a rim;

a removable cap liner including means for sealably engaging the container at its open end in a manner which retains fluids in the container; and a removable cap over the cap liner and thereby over the open end of the container including means to break the cap liner and open the container upon movement of the cap;

a plurality of pressure-release vents in the cap liner and means in the cap for closing the vents;

whereby, pressure is released from the pressure-release vents upon moving the cap followed by breaking the cap liner upon continued movement of the cap.

9. The container and closure assembly according to claim 8, including a series of vents circumferentially spaced on said cap liner, and a series of plugs on said cap for closing the vents.

10. The container and closure assembly according to claim 8, wherein the means to break the cap liner provides a sequential action of first venting pressure followed by breaking the cap liner.

11. A container and closure assembly, comprising:

a container including a bottom portion and an encircling wall extending therefrom and defining a body portion, wherein the body portion has an open end defined by a rim;

a removable cap liner including means for sealably engaging the container at its open end in a manner which retains fluids in the container;

a removable cap over the cap liner and thereby over the open end of the container, said cap having a skirt which extends over a portion of said body portion and wherein the cap and liner are adapted for reclosing the container after removal from the container;

wherein the cap includes means for engaging the cap liner to at least partly remove said liner, the cap liner includes multi-sided means adapted to be engaged by the cap, and the cap means for engaging comprises a multi-sided receiver means, said multi-sided means adapted to be engaged and said receiver means including matching surfaces of engagement; and wherein the liner includes pressure relief vents.

* * * * *